D. F. Hartford.
Drill-Stock.

Nº 54,069.      Patented Apr. 17, 1866.

Witnesses;

Inventor;
D Frank Hartford

UNITED STATES PATENT OFFICE.

D. FRANK HARTFORD, OF BOSTON, MASSACHUSETTS, ASSIGNOR TO HIMSELF AND EDMUND TARBELL, OF SAME PLACE.

IMPROVEMENT IN DRILL-STOCKS.

Specification forming part of Letters Patent No. 54,069, dated April 17, 1866.

*To all whom it may concern:*

Be it known that I, D. FRANK HARTFORD, of Boston, in the county of Suffolk and State of Massachusetts, have invented a new and useful Improvement in Drill-Stocks; and I do hereby declare that the following is a full, clear, and exact description of the construction and operation of the same, reference being had to the accompanying drawings, forming a part of this specification, in which—

Figure 1:
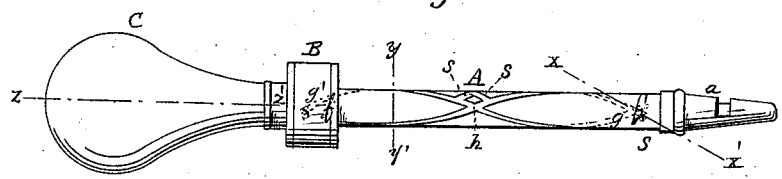
Figure 2:
Figure 3:
Figures 4, 5:
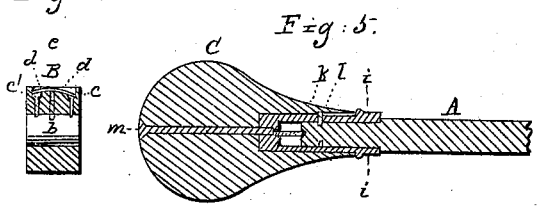

Figure 1 is a transparent plan; Fig. 2, a cross-section at line $y\,y'$, Fig. 1; Fig. 3, a section at line $x\,x'$ or on any of the switches $s$, Fig. 1; Fig. 4, a section of the chuck B; Fig. 5, a section of cap C at line $z\,z'$, Fig. 1.

Similar letters denote like parts in all the figures.

The nature of this invention consists in so combining a direct and reverse helical groove on the spindle of a drill-stock with inclined planes or switches at the ends of the grooves and at their crossing that the guide-pins of a chuck sliding on said spindle may constantly give a rotation to the spindle and produce a regular uniform forward motion of the drill, thus insuring that the metal to be perforated shall be cut instead of worn or planished away, and thereby saving the power used in operating drill-stocks on other plans, economizing time, and giving more perfect finish to the work; also, in a device for the constant regulation of the centering of the drill.

To enable others skilled in the art to make and use my said invention, I will now proceed to describe the construction and operation of the same.

A is the spindle of the drill-stock, being provided at one end with a tip, $a$, for the bit, and at the other with a cap, C, in which it revolves by an arrangement hereinafter to be described.

B is the sliding chuck, (a cylinder of metal perforated in its axis to fit upon the spindle A,) which is perforated from circumference to near the center by three holes, two of which are in an axial line and the third at a point which, with the other two holes, forms an isosceles triangle, the opposite angles of which are each equal to the interior angle made by either helical groove, hereinafter to be described, with the axis or plane of the axis of the spindle A; or if desired to have unequal velocities in the motion of the drill, this triangle may be of unequal sides, and the said grooves of corresponding unequal pitch.

In the radial holes of chuck B are placed three pins, one of which, $b$, at the apex of the triangle, is fixed, and two, $c\,c'$, placed in the axial holes, are loose. Upon the top of these last pins, $c\,c'$, rests a spring, $d$, confined at a point equidistant from the two pins $c\,c'$ by a set-screw, $e$, and forcing said pins into the helical grooves, unless prevented.

On the exterior of the spindle A are two helical grooves, $f\,f''\,g\,g'$, making about the spindle A a half-turn, or some number of turns a multiple of a half-turn. One of these grooves, $f\,f'$, is direct, the other, $g\,g'$, reverse.

At one end of each groove $f'\,g'$, and at their crossing $h$, are switches consisting of inclined planes from the bottom of the grooves to the level of the exterior circumference of the spindle A. These switches are lettered $s$, and their form is shown at Fig. 3. These switches recur at every half-turn of the helical grooves, being of the plan shown at $h$ for intermediate points, and of the plan shown at $f'\,g'$ for the ends of the grooves.

A shoulder at each end of the spindle checks the chuck B at a proper time.

The spindle A has a recessed shoulder at its top, which fits into a sleeve, $i$, having a central pivot, $k$, and to which it is confined by a set-screw, $l$, passing through the sleeve and fitting into a cylindrical groove in the spindle, to allow of revolution. The top of the axis of the spindle centers against said pivot-pin $k$, and the sleeve and its appendages just described are inclosed in cap C, fastened to the sleeve $i$ by a screw, $m$, pressing on top of pivot $k$, and allowing it to be pressed more strongly against the head of the spindle, as occasion may require, and securing accurate centering of the drill.

The drill-stock being together and the chuck B at the upper end of the spindle A, pins $b$ and $c$ will be in groove $f\,f'$, and pin $c'$ will be on the inclined plane or switch at $g'$. On moving the chuck outward it is plain that for the first half-turn pins $b$ and $c$ will follow groove $f\,f'$, revolving spindle A, while pin $c'$ will follow parallel to pin $c$, its extremity resting on the circumference of the spindle and that part of the spring $d$ on that side, being pressed upward until it arrives at groove $g\,g'$, near point $h$, when pin $c'$ will follow parallel to pin $c$, dropping, by the force of the spring, into groove $g\,g'$, and, the motion being continued, will rise on the inclined plane $s$, and continue as before to the extremity of the spindle A, when it again drops into groove $g\,g'$, while pin $c$ rises on the inclined planes $s$, at $f'$.

The return-stroke may be similarly described, pin $c$ being the outside pin, pin $c'$ the guiding-pin, and revrse groovee $g\,g'$ the guiding-groove.

The rhombus at $h$, made by the crossing-grooves $f f'\ g g'$ and the switches or inclined planes $s$, should have its diagonal parallel to the axis of the spindle a little less than the interior distance between the two pins $c\,c'$, and its sides parallel to the grooves.

What I claim as my invention, and desire to secure by Letters Patent of the United States, is—

The combination of the direct and reverse helical grooves $f f'\ g g'$, as arranged with inclined planes $s$ at $f'$, $g'$, and $h$, with the chuck B and its pins $b\,c\,c'$, all constructed and operating substantially as described.

D. FRANK HARTFORD.

Witnesses:
THOS. WM. CLARKE,
GEO. R. CLARKE.